United States Patent [19]

Alexander

[11] Patent Number: 5,345,470
[45] Date of Patent: Sep. 6, 1994

US005345470A

[54] METHODS OF MINIMIZING THE INTERFERENCE BETWEEN MANY MULTIPLE FMCW RADARS

[76] Inventor: Richard O. Alexander, 2279 Van Ness Ave., San Francisco, Calif. 94109

[21] Appl. No.: 40,794

[22] Filed: Mar. 31, 1993

[51] Int. Cl.$^5$ ............................................. H04K 1/00
[52] U.S. Cl. ...................................... 375/1; 342/200; 342/101
[58] Field of Search ................. 375/1; 342/90, 91, 92, 342/98, 99, 101, 189, 160, 161, 200

[56] References Cited

U.S. PATENT DOCUMENTS

| | | | |
|---|---|---|---|
| 4,697,157 | 9/1987 | Buddecke et al. | 342/200 X |
| 5,053,780 | 10/1991 | Thaler et al. | 342/200 |
| 5,157,408 | 10/1992 | Wagner et al. | 375/1 X |
| 5,175,743 | 12/1992 | Crespo et al. | 375/1 |
| 5,191,337 | 3/1993 | Brovko et al. | 342/200 |
| 5,235,616 | 8/1993 | Sebilet | 375/1 |

*Primary Examiner*—Tod R. Swann
*Attorney, Agent, or Firm*—Owen, Wickersham & Erickson

[57] ABSTRACT

Three methods are used to minimize the interference between multiple FMCW radars. The first, basic method is to use spread spectrum waveforms which differ for each radar. The FMCW waveforms have different modulation slopes for each frequency excursion. The waveforms also have different center frequencies for each excursion thus in total spreading the spectrum in frequency and modulation slope. The second method used is to control the power output for FMCW radars which have narrow beam scanning antennas, according to the azimuth position of the antenna. The third method is to select separate frequency bands for any interference which would still be above threshold. Selection would be by either infrastructure information or by comparison of "own" radar code to that received from each interfering radar over a separate, but related modulated CW transmission.

12 Claims, 5 Drawing Sheets

METHODS OF MINIMIZING THE INTERFERENCE BETWEEN MANY MULTIPLE FMCW RADARS

FIELD OF THE INVENTION

This invention relates to methods to reduce interference between multiple FMCW radars.

BACKGROUND OF THE INVENTION

In environments where there are many FMCW radars operating in the same vicinity and in the same frequency region, methods are necessary to reduce the interference such that the probability of an interfering signal being above threshold is low while simultaneously minimizing the total operating bandwidth covering all the radars.

One invention (Mehltretter U.S. Pat. No. 3,824,592) stochastically varies the frequency extent or introduces a time period of no frequency modulation. Neither of these techniques will work for a radar which needs the entire integration time during a required update rate, such as vehicle collision warning radars, for two reasons:

1. Non-modulated portions will reduce the integration time and thus the required detection range.
2. Changing frequency extent will change the range resolution.

Moreover with interfering radars at much less ranges than required detection ranges this single dimensional approach will not come close to providing interference levels below detection threshold.

This is especially true in applications where interference from any one scan will be sufficient to cause a significant loss in performance, requiring a very low probability of interference for satisfactory performance. Vehicle collision warning is one such application as a loss of information on any one scan of the environment will cause a significant loss of warning time.

Another invention (Chilak and Wehage U.S. Pat. No. 4,106,108) detects the approach of interfering signals towards an acceptable band pass of the radar with which it is associated. Their invention then shifts the phase of at least one of the radars in order to prevent interference. This requires coordination between the radars and only works with a small number of radars (their description covers just two radars). When there are many radars operating in the same vicinity, phase shifting is impractical. One such environment exists for vehicular collision warning radars in either an intracity or multilane highway environment. Here, the number of radars does not allow for coordination between the vehicles to reduce the interference.

Figure 1:
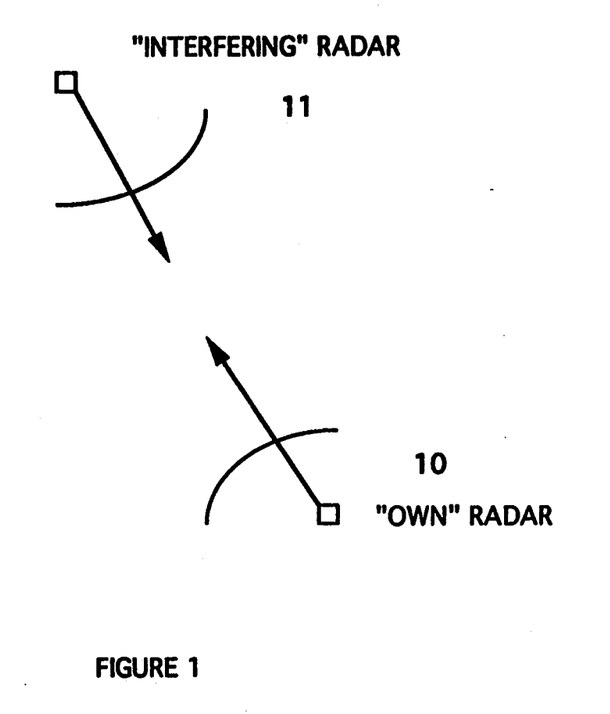
FIG. 1 is the geometry of two radars in scan synchronization.

In many of these applications, when FMCW modulation is used other factors (rain backscatter, required azimuth coverage, and multiple target separation) require a narrow beam scanning radar. Thus the problem resolves itself into two parts:

1. Minimizing the number of radars with interference levels above threshold, when in scan synchronization (FIG. 1). Subsequently, providing means to separate these interfering radars.
2. Minimizing interference when the scanning beams are not in synchronization with each other.

To solve this multiple part problem three techniques are used:

1. Spread spectrum FMCW signatures.
2. Power control as a function of angle.
3. Frequency band control either by external reference or by coordination between the radars.

Note that contrary to another invention (Brookner U.S. Pat. No. 3,787,853) here only one frequency is generated at any one time. Brookner's invention with multiple frequencies was designed to reduce clutter. Here the object is to significantly reduce interference from other multiple active radars.

SUMMARY OF THE INVENTION

The basic method of the invention is to provide spread spectrum codes for all of the radars. These codes are either separate for each radar or stochastically generated for each radar. The FMCW signal is spread in both center frequency of operation and slope of the modulation waveform.

This is accomplished with two basic limitations:

1. Increase in center frequency codes causes the total operating band width to increase.
2. Modulation waveform codes are limited by aliasing between measurement of range and velocity in the FMCW waveform.

Thus a second method of the invention is to control the power output as a function of angle for those applications where less power is needed at some angles. This occurs in the collision warning application.

In this case, a potential head-on collision occurs at small angles from the 0° azimuth and thus the collision has a closing speed of approximately the sum of the speeds of both of the vehicles. However, junction collision normally occurs at (or close to) 90° collision angles and thus has reduced closing speeds. With these reduced closing speeds a reduced detection range is sufficient to provide the same warning time. Thus reduced transmitter power is sufficient.

The third method used is required due to the fact that some of the radars are in scan synchronization, at least for some of the time. In this case the interfering power is still above threshold for the close-in (short range) radars even with spread spectrum and power reduction.

For these radars, phase shifting does not work since spread spectrum is used. Instead frequency band selection is used in one of two ways:

1. External Reference. The synchronization problem occurs when antennas are pointing at each other. When an external reference is able to separate the radars, the solution is to receive a signal from the reference (infrastructure) to select the band. This is effective up to 4 frequency bands (equivalent to one intersection as in FIG. 2). However, for more complex intersections, for vehicles turning from one road to another, and when infrastructure information is not available an in-vehicle system is necessary.
2. In-vehicle System. To allow the multiple interfering radars to choose different bands (not to choose the same band) a coded signal is sent between the vehicles. Reception of these coded signals allows the multiple radars to select separate bands.

BRIEF DESCRIPTION OF THE DRAWINGS

FIGS. 3 are graphs of frequency versus time of two independent radars for the cases of:

FIG. 3a) Uncoded signatures

FIG. 3b) Slope coded signatures
FIG. 3c) Spread spectrum coded signatures

DETAILED DESCRIPTION

Figure 3A:
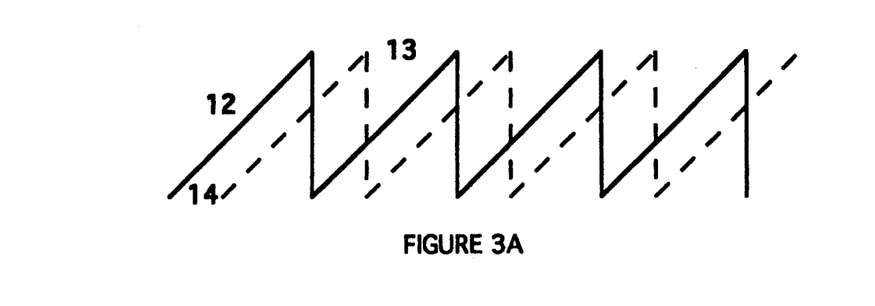

Two uncoded sawtooth FMCW signatures 12 and 13 are shown in FIG. 3a. In one application typical values might be an FM bandwidth of 300 MHz with a total video bandwidth of 10 MHz. Thus at the phase difference 14 between the waveforms yielding a frequency difference greater than 10 MHz there is no interference.

Figure 3B:
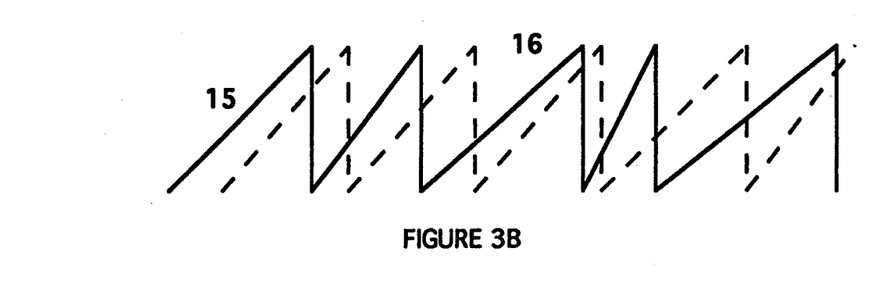

Two single dimensional FM slope coded FMCW waveforms 15 and 16 are shown in FIG. 3b (only part of the code is shown). Here, the slope of each segment of each waveform varies for each excursion of the FM bandwidth. Contrary to Brovko and Nguyen U.S. Pat. No. 5,191,337 this multislope code exists within the processing time of each return thus the receiver follows the slope of the transmitter (for each radar) to process the entire code during each update time.

Different codes are designated for each radar. The codes are repetitive and have lengths established when the sum of the times of each segment equals the required update rate for the radar processor. For this single dimensional code the interference level between two radars is a random variable for any two codes because of the changing phase relationship. There is a significant reduction in interference but in many applications (e.g. collision warning radar) the reduction is not sufficient.

Figure 3C:
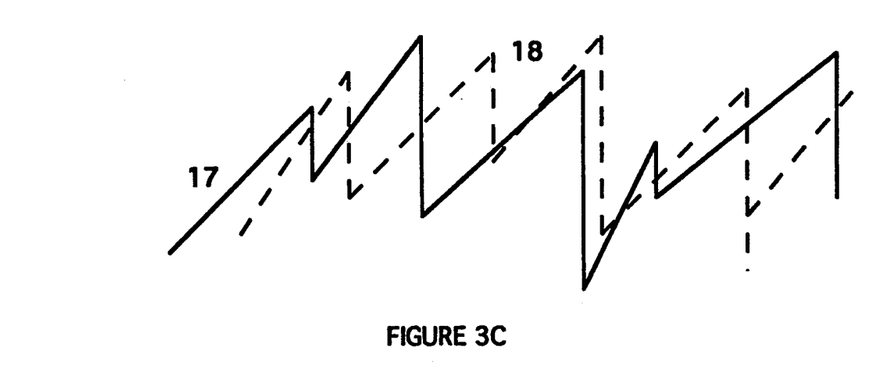

Thus the invention uses the two dimensional coded waveforms 17 and 18 of FIG. 3c where the two codes are independent (only part of the code is shown). Here the start frequency as well as the slope of each segment of each waveform varies for each excursion of the FM bandwidth. Different two dimensional codes are designated for each radar or stochastically chosen for each radar. This yields a much greater reduction in interference.

Figure 4:
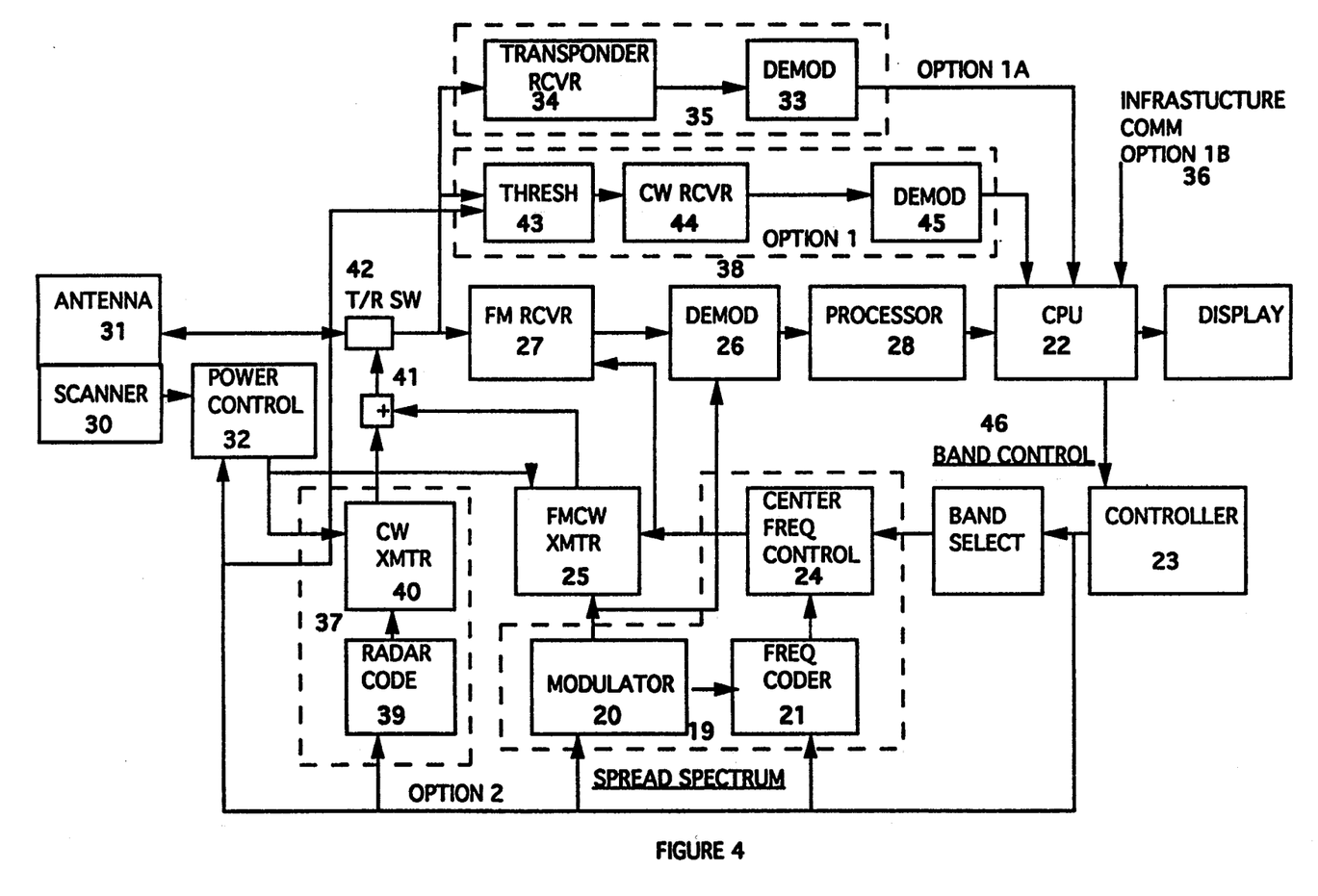
FIG. 4 is a block diagram of an FMCW radar system with the three minimizing interference methods implemented.

FIG. 4 illustrates the general principles of the invention. This figure shows the embodiment where each radar has a different code. Another embodiment is where the two dimensional code (slope and frequency position) is stochastic for each radar.

Spread spectrum section 19 is loaded with the particular code for the slope (modulator 20) and center frequency (to freq coder 21) from the code stored in the CPU 22 through the controller 23. At the end of each sweep the modulator 20 tells the freq coder 21 to load the next frequency into the center freq controller 24. The modulator modulates the FMCW Xmtr 25 and sends that modulated data also to the demodulator 26. The center frequency controller 25 sends the frequency data to the FMCW Xmtr 25 and also to the FM Rcvr 27. This allows the processor 28 to follow the spread spectrum code to measure velocity and range for all returns above threshold. (In the alternate embodiment at the end of each sweep the next slope and frequency is obtained stochastically.)

An example of the parameters of one FMCW radar is:
1. Range resolution=2 feet yielding FM bandwidth of 246 MHz.
2. Modulation frequency varying from 30 to 45 KHz.
3. Update time ($T_1$) of 2 msec (for required velocity resolution)
4. Required detection range of 350 feet.

For these parameters the 0–350 foot range is provided with a video band width (out of 246 MHz) of 5.3–7.9 MHz while each 2 foot range cell covers 171–257 KHz.

The radar return from an object is integrated over the entire 2 msec for each 171–257 KHz range cell. The object of the spread spectrum is to reduce the time in each cell ($T_c$) over the 2 msec integration time to a low enough value that the interfering signal is below the system threshold. Thus the spread spectrum gain is $$SS(dB) = 10 \log (2/T_c) \tag{1}$$

The code length (L) is a random variable:

$$\sum_{i=1}^{L} T_{mi} = T_1 \tag{2}$$

where $T_{mi}$ is the length of the ith slope segment.

At each code position the FMCW waveform has a modulation frequency of one of $N_m$ steps and a center frequency of one of $N_c$ steps for a total number of positions of $N_m * N_c$.

Total time ($T_c$) for the interfering signal in any range cell is a random variable for any two particular codes as well as over all codes. Even if the same code were chosen for two interfering radars, $T_c$ would be a random variable due to the phase difference between the two signals.

The parameters under control of the radar designer for this spread spectrum system are:
1. Modulation frequency limits (limited by range/velocity aliasing).
2. Modulation frequency step size. However, there is a limiting value below which little spread spectrum gain is realized.
3. Center frequency variation (total bandwidth limited).
4. Center frequency step size. However, there is little improvement with step sizes smaller than the video bandwidth.

Since $T_c$ (and thus the spread spectrum gain) is a random variable the result is that the mean time between interfering signals is dependent on the density of the interfering signals as well as the slope and frequency extents. With the limitations on modulating frequency and center frequency, higher density environments warrant using the second method (power control) in conjunction with spread spectrum.

Figure 5:
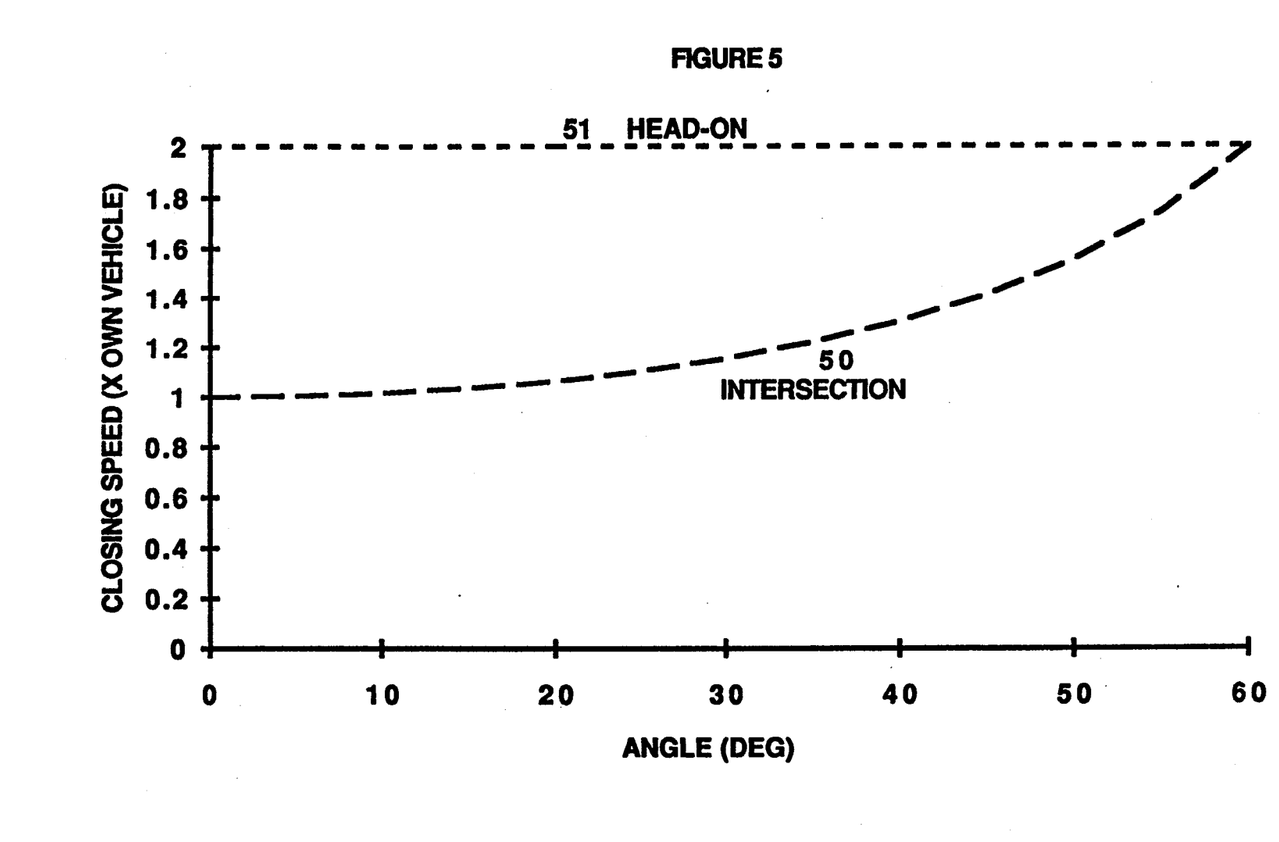
FIG. 5 is a graph showing the comparison of closing speeds for head-on and 90° intersection collisions.

As an example of the availability of power control as a function of angle see FIG. 5. This shows the closing speed as a function of angle for a 90° intersection 50 compared to that for head-on 51. With this variation of closing velocity, power reduction still yields the same detection time as in the head-on case. This power reduction (from head-on) is:

$$P_{red}(dB) = 40 * \log (2 * \cos \alpha) \tag{3}$$

For head-on geometry (as in a multi-lane highway) the greater the angle, the closer the range to the target in an opposing lane, thus the more power reduction is required in order to reduce the interfering power to below the threshold. Thus the power reduction required is:

$$P_{req}(dB) = K - 20 * \log (\sin \alpha) \tag{4}$$

where the constant is a function of the lane separation. In summary, the power reduction used is that of equation 3 unless there are short range targets. In this case, equation 4 is used.

In FIG. 4, power control 29 is provided by the scanner 30 which drives the antenna 31. This figure shows a free running scanner (not under control by the CPU). The scanner 30 also provides scan data to the power control 32 for control of the transmitter power either according to equation 3 or equation 4 dependent on the existence of short range targets. Selection of the correct equation is provided by CPU 22 information through the controller 23.

Methods 1 and 2 cause the mean time between interfering alarms to be above the required time limit for any density of radars. As the interfering environment requirement increases the total bandwidth occupied by the center frequency variations increases to obtain the required increased spread spectrum gain.

Figure 2:
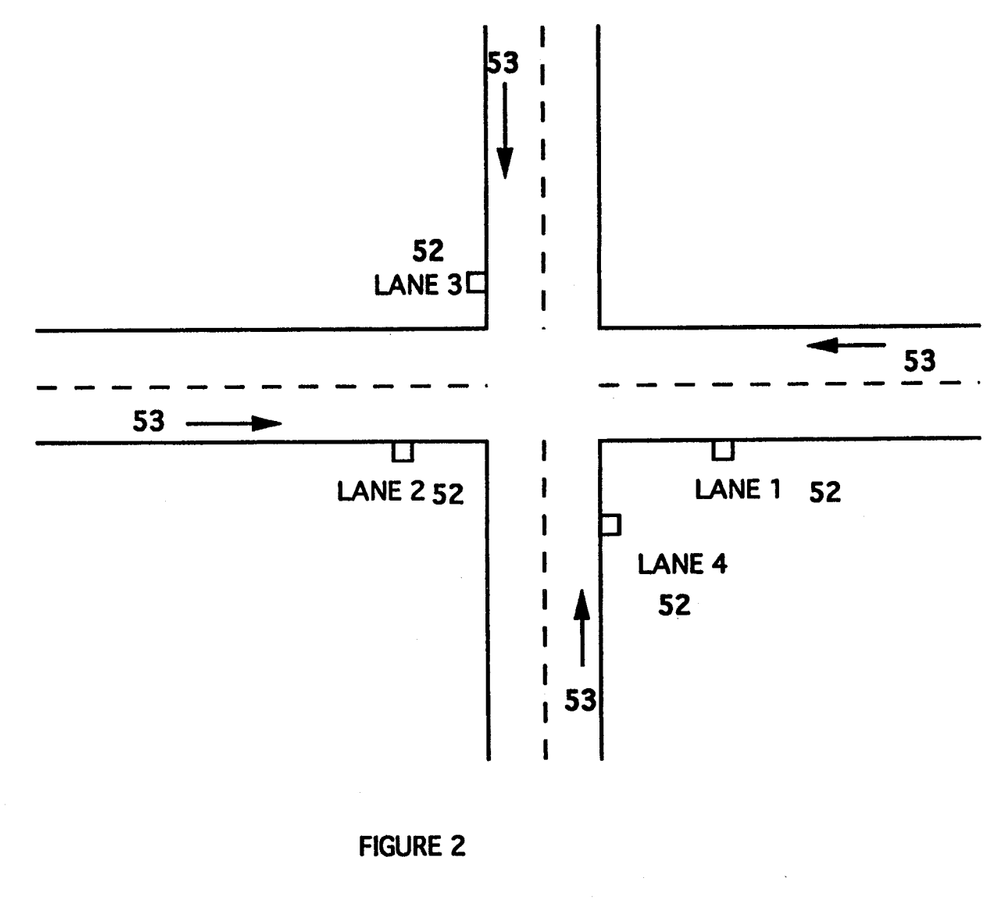
FIG. 2 is the geometry of an intersection with roadway information for the vehicles.

However, there still are synchronous scan interfering radars. These are handled by selection of one of B separate frequency bands. When possible the band selection is handled as shown in FIG. 2. Here, communication with the infrastructure, either by transponders 52 responding to the radars 53 or separate communications, establishes the band for each vehicle.

This also is shown in FIG. 4. Option 1a 33 is provided by a transponder receiver 34 which responds to the transponder frequency return and the demodulator 35 which stripes off the lane/band code. Option 1b 36 is provided by a separate communications device (not shown) providing lane/band code directly to the CPU 22.

However, not all intersections are controlled and not all environments have the ability to receive external reference commands. In these cases, in-vehicle coding is used for selection.

The system, with spread spectrum 19 and power output control 32, is designed for a maximum number of interfering, synchronous radars ($M_u$), dependent on the density of the interference. Then the number of bands B is set=$M_u+1$.

Each radar outputs a coded CW signal which is different for each radar. This signal is transmitted at a slightly lower frequency than that of the FMCW signal (using the same antenna) so that the beamwidth is slightly greater than that of the FMCW signal. Threshold for this signal is set for a value of spread spectrum rejection of X less than that for the average rejection of the spread spectrum signals. With X large enough, the interference is detected for most of the conditions before the interference actually occurs.

The code consists of a unique radar number code. The radar compares its own code ($C_o$) to those of each interfering signal ($C_i$) and selects the band according to algorithm A (also known as an example of a predetermined function). Some examples of this algorithm are given in the table below.

TABLE I

| Examples of Band Selection for Algorithm A. | | |
|---|---|---|
| Number Interfering | Interfering Code* | Result |
| 1 | Lower | B |
|  | Higher | 1 |
| Mu |  | 1 + Number interfering lower than own |
| 2 | Lower | B |
|  | Higher | 1 |

TABLE I-continued

| Examples of Band Selection for Algorithm A. | | |
|---|---|---|
| Number Interfering | Interfering Code* | Result |
|  | Between | $2 + \text{Fix}\dfrac{((B-2)*(C_o - C_{i1}))}{(C_{i2} - C_{i1})}$ |

*With respect to own code.

For other actual values of number of interfering radars the algorithm picks the band number by dividing the interfering codes into equally spaced packets (as above with 2 interfering radars) to place the "own" radar band in the band with the packet number. Since the interference detected between radars will be mutual, a selection in the upper bracket for "own" radar results, most probably, in a selection in the lower packet for the "interfering" radar thus resulting in separate bands.

This coding technique is shown in FIG. 4 as Option 2 in two places 37 and 38. The specific code is sent from the CPU 22 through the controller 23 to the radar coder 39 for modulation of the CW Xmtr 40. This CW Xmtr 40 is under the same power control 32 as the FMCW Xmtr 25. The FMCW Xmtr 25 and CW Xmtr 40 are added 41 and output via the Transmit/Receive SW 42.

As the antenna 31 scans, CW signals from interfering signals (above threshold 43) are received in the CW receiver 44. This threshold varies dependent on the amount of spread spectrum gain provided by the code as input from the controller 23. The interfering signal codes are then demodulated 45 and sent to the CPU 22. The CPU compares the codes received with its own code to select the band 46.

While the preferred embodiments of the invention have been illustrated and described, variations will be apparent to those skilled in the art.

I claim:

1. An apparatus to generate and receive spread spectrum FMCW waveforms comprising:
    means for generating a first code and a second code independent from said first code;
    a frequency modulator having a first output signal with a modulation slope that changes according to said first code provided from said means for generating;
    a demodulator having a demodulator function to demodulate a received signal from an FMCW receiver, said demodulator function following said modulation slope of said first output signal received from said frequency modulator; and
    a frequency coder which controls a center frequency of an FMCW transmitter and a center frequency of said FMCW receiver according to said second code received from said means for generating, wherein said center frequency of said FMCW receiver duplicates said center frequency of said FMCW transmitter.

2. An apparatus to generate and receive spread spectrum FMCW waveforms as in claim 1, further comprising:
    a plurality of apparatuses as in claim 1,
    wherein, when said first code and said second code of each of said plurality of apparatuses are combined to form a resultant product code for each apparatus, a first resultant product code for a first apparatus is repetitive and different from a second resultant product code of a second apparatus of said plurality of apparatuses.

3. The apparatus of claim 1 wherein said first code and said second code are both generated stochastically.

4. The apparatus of claim 1 wherein said first code is constant.

5. The apparatus of claim 1 wherein said second code is constant.

6. An apparatus as in claim 1, further comprising:
a scanner having an output position signal proportional to an angular position of an antenna; and
a power control that changes its output signal according to said output position signal received from said scanner;
wherein said power control controls the power output of said FMCW transmitter.

7. An apparatus to generate and receive spread spectrum FMCW waveforms according to claim 1 further comprising:
a scanner having an output position signal proportional to an angular position of an antenna;
a power control that changes its output signal according to said output position signal received from said scanner
wherein said power control controls the power output of said FMCW transmitter;
wherein when a plurality of FMCW transmitters operate simultaneously, said plurality of FMCW transmitters select a plurality of frequency bands for operation according to an apparatus comprising:
a first modulated CW transmitter which is modulated according to a first CW code, such first CW code is different from a second CW code for a second modulated CW transmitter;
means for changing a power output of said first modulated CW transmitter identically and simultaneously to that of a corresponding first FMCW transmitter;
a first modulated CW receiver to receive a plurality of CW codes from a plurality of modulated CW transmitters separate from said first modulated CW transmitter, said plurality of CW transmitters including said second modulated CW transmitter; and
a threshold control for said first modulated CW receiver which changes according to an input signal from a CPU dependent on a number of independent digitization levels of said first spread spectrum code;
wherein said CPU compares said first CW code to said plurality of CW codes received and selects a band of operation according to a predetermined function.

8. An apparatus to select the frequency bands for each transmitter of a plurality of FMCW transmitters, comprising:
an FMCW transmitter being modulated according to a first spread spectrum code;
a first modulated CW transmitter which is modulated according to a first CW code, such first CW code is different from a second CW code for a second modulated CW transmitter;
means for changing a power output of said first modulated CW transmitter identically and simultaneously to that of a corresponding first FMCW transmitter;
a first modulated CW receiver to receive a plurality of CW codes from a plurality of modulated CW transmitters separate from said first modulated CW transmitter, said plurality of CW transmitters including said second modulated CW transmitter; and
a threshold control for said first modulated CW receiver which changes according to an input signal from a CPU dependent on a number of independent digitization levels of said first spread spectrum code;
wherein said CPU compares said first CW code to said plurality of CW codes received and selects a band of operation according to a predetermined function.

9. An apparatus to select the frequency bands for each transmitter of a plurality of FMCW transmitters, according to claim 8, wherein said predetermined function is dependent on:
the number of CW codes received;
the number of bands available; and
the position of the number of your code with respect to the positions of the numbers of all received CW codes.

10. An apparatus to select the frequency bands for each transmitter of a plurality of FMCW transmitters, according to claim 8, further comprising:
means for generating a first code and a second code independent from said first code, wherein said first code when combined with said second code comprises said first spread spectrum code;
a frequency modulator having a first output signal with a modulation slope that changes according to said first code provided from said means for generating;
a demodulator having a demodulator function to demodulate a received signal from a first FMCW receiver, said demodulator function following said modulation slope of said first output signal received from said frequency modulator; and
a frequency coder which controls a center frequency of said first FMCW transmitter and a center frequency of said first FMCW receiver according to said second code received from said means for generating, wherein said center frequency of said first FMCW receiver duplicates said center frequency of said first FMCW transmitter.

11. A method to minimize the interference between a plurality of FMCW radars comprising the steps of:
generating a first two-dimensional code wherein a first dimension of the first code causes the modulation slope of the FMCW waveform to vary linearly proportional to the value of the first code in said first dimension and a second dimension of the first code, independent of said first dimension, causes a center frequency of said FMCW waveform to vary linearly proportional to the value of the first code in said second dimension, where said first two-dimensional code of a first radar is different from a second two-dimensional code of a second radar;
providing different codes in said FMCW radars with either repetitive or stochastic codes wherein in either case the number of independent digitization levels of both dimensions of the codes increase with the number of multiple radars.

12. A method to minimize the interference between a plurality of FMCW radars as in claim 11, further comprising the steps of:

controlling the power output of a FMCW transmitter dependent on the azimuth position of an antenna and the range to the nearest FMCW radar at said azimuth position; and selecting the band of operation of said FMCW transmitter by:

comparing a radar number of said first radar to the radar numbers of all other radars whose power output is above threshold, said threshold established by the steps of:

transmitting the radar number over a modulated CW transmission with the same power variations as said FMCW transmitter; and establishing the threshold dependent on the number of digitization levels of both dimensions of said two-dimensional code;

selecting the band number according to a predetermined function.

* * * * *